United States Patent
Kawashima

(10) Patent No.: US 12,411,678 B2
(45) Date of Patent: Sep. 9, 2025

(54) CONTROL DEVICE

(71) Applicant: TOYOTA JIDOSHA KABUSHIKI KAISHA, Toyota (JP)

(72) Inventor: Satoshi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/220,583

(22) Filed: Jul. 11, 2023

(65) Prior Publication Data

US 2024/0095013 A1    Mar. 21, 2024

(30) Foreign Application Priority Data

Sep. 21, 2022   (JP) ................. 2022-149689

(51) Int. Cl.
*G06F 9/445*   (2018.01)
*G06F 8/65*   (2018.01)

(52) U.S. Cl.
CPC ..................... *G06F 8/65* (2013.01)

(58) Field of Classification Search
CPC .......... G06F 8/65; G06F 1/26; G06F 11/1433; G06F 8/658; G06F 8/30; B60R 16/03; B60R 16/0238; H04W 4/40
See application file for complete search history.

(56) References Cited

U.S. PATENT DOCUMENTS

| | | | | |
|---|---|---|---|---|
| 11,528,330 B2* | 12/2022 | Golgiri | ................. | B60W 50/14 |
| 2017/0197617 A1* | 7/2017 | Penilla | ................. | G08G 1/0129 |
| 2018/0203683 A1* | 7/2018 | Kim | ......................... | G06F 8/65 |
| 2019/0108014 A1* | 4/2019 | Nakamura | ............. | B60R 16/02 |

FOREIGN PATENT DOCUMENTS

| | | | |
|---|---|---|---|
| JP | 2008-071149 A | 3/2008 | |
| JP | 2019-057136 A | 4/2019 | |

* cited by examiner

*Primary Examiner* — Chuck O Kendall
(74) *Attorney, Agent, or Firm* — Oliff PLC

(57) ABSTRACT

A control device includes: a monitoring unit that monitors a storage amount and a temperature of a battery that supplies electric power for executing a software update process; a determination unit that determines whether or not the storage amount of the battery is equal to or greater than the first storage amount and whether or not the temperature of the battery is equal to or greater than the first temperature; and a control unit that, when the temperature of the battery at the time of starting the vehicle is less than the second temperature that is lower than the first temperature, performs control for executing the update process when the determination unit determines that the storage amount of the battery is equal to or greater than the first storage amount and the temperature of the battery is equal to or greater than the first temperature after the vehicle finishes traveling.

8 Claims, 4 Drawing Sheets

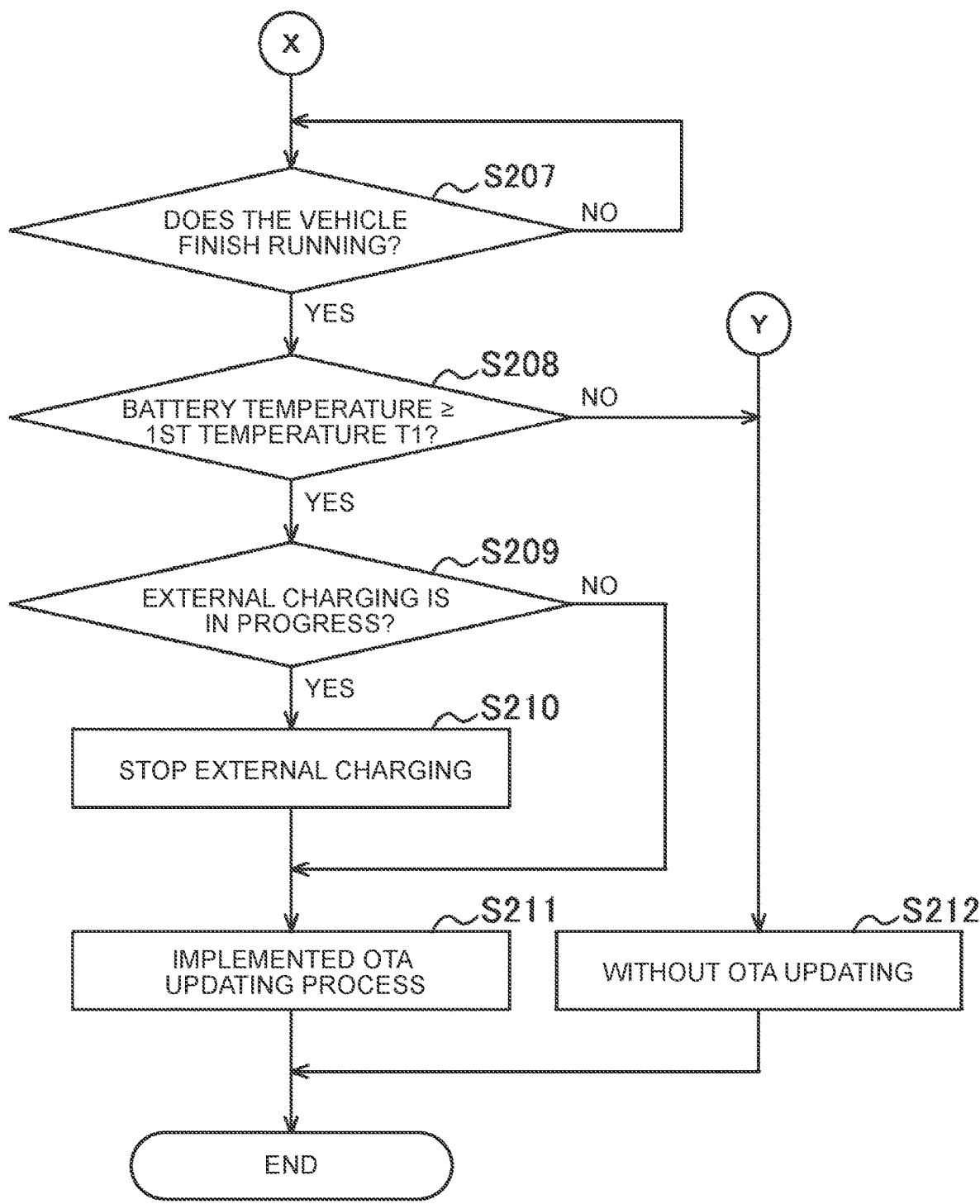

CONTROL DEVICE

CROSS-REFERENCE TO RELATED APPLICATION

This application claims priority to Japanese Patent Application No. 2022-149689 filed on Sep. 21, 2022 incorporated herein by reference in its entirety.

BACKGROUND

1. Technical Field

The present disclosure relates to a control device for controlling update of software of an electronic control unit mounted on a vehicle.

2. Description of Related Art

Japanese Unexamined Patent Application Publication No. 2019-057136 (JP 2019-057136 A) discloses a system for updating software of an electronic control unit mounted on a vehicle, using update data downloaded from a server. It is disclosed that, in this system, an update process is executed when the power storage amount of the battery is equal to or greater than the power storage amount required for the software update process, while the update process is executed after the battery is charged so that the power storage amount of the battery is equal to or greater than the power storage amount required for the update process when the power storage amount of the battery is less than the power storage amount required for the software update process.

SUMMARY

A lead battery may be used as a battery that supplies electric power for the software update process. However, the characteristics of the lead battery are largely dependent on temperature, and even if power (amount of electric power) required at room temperature can be output (secured), power required at low temperature cannot be output in some cases. Thus, when the temperature of the battery is low, if the update process is started only by the determination based on the power storage amount of the battery, there is a risk that the power supply is interrupted during the course of the update process (power failure) and the update is ended in an incomplete state. In addition, even if the software update process is completed, there may be a case where there is no power remaining to start the vehicle. Therefore, there is room for further improvement on a determination condition for permitting the execution of the software update process of the electronic control unit.

The present disclosure has been made in view of the above issue, and an object of the present disclosure is to provide a control device capable of performing a software update process of an electronic control unit while securing startability of a vehicle when a temperature of a battery is low.

In order to solve the above issue, an aspect of the technique of the present disclosure is a control device for controlling update of software of an electronic control unit mounted on a vehicle. The control device includes: a monitoring unit for monitoring a power storage amount and a temperature of a battery that supplies electric power for performing an update process of the software; a determination unit for determining whether the power storage amount of the battery is equal to or greater than a first power storage amount and whether the temperature of the battery is equal to or higher than a first temperature; and a control unit for performing control for executing the update process when the determination unit determines that the power storage amount of the battery is equal to or greater than the first power storage amount and the temperature of the battery is equal to or higher than the first temperature after traveling of the vehicle ends, in a case where the temperature of the battery at a time of a start of the vehicle is lower than a second temperature that is lower than the first temperature.

According to the control device of the present disclosure, the software update process of the electronic control unit can be performed while securing the startability of the vehicle when the temperature of the battery is low (lower than the second temperature). Therefore, it is possible to suppress the software update process of the electronic control unit from ending in an incomplete state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2B is a flowchart of a process of software-updating control executed by a control device.

DETAILED DESCRIPTION OF EMBODIMENTS

The control device mounted in the vehicle of the present disclosure controls whether or not the software update processing of the electronic control unit is performed based on the electric storage amount of the auxiliary battery and the temperature of the auxiliary battery. Thus, when the temperature of the auxiliary battery is low, the software update process of the electronic control unit can be performed while securing the startability of the vehicle. Hereinafter, an embodiment of the present disclosure will be described in detail with reference to the drawings.

Embodiment

Configuration

Figure 1:
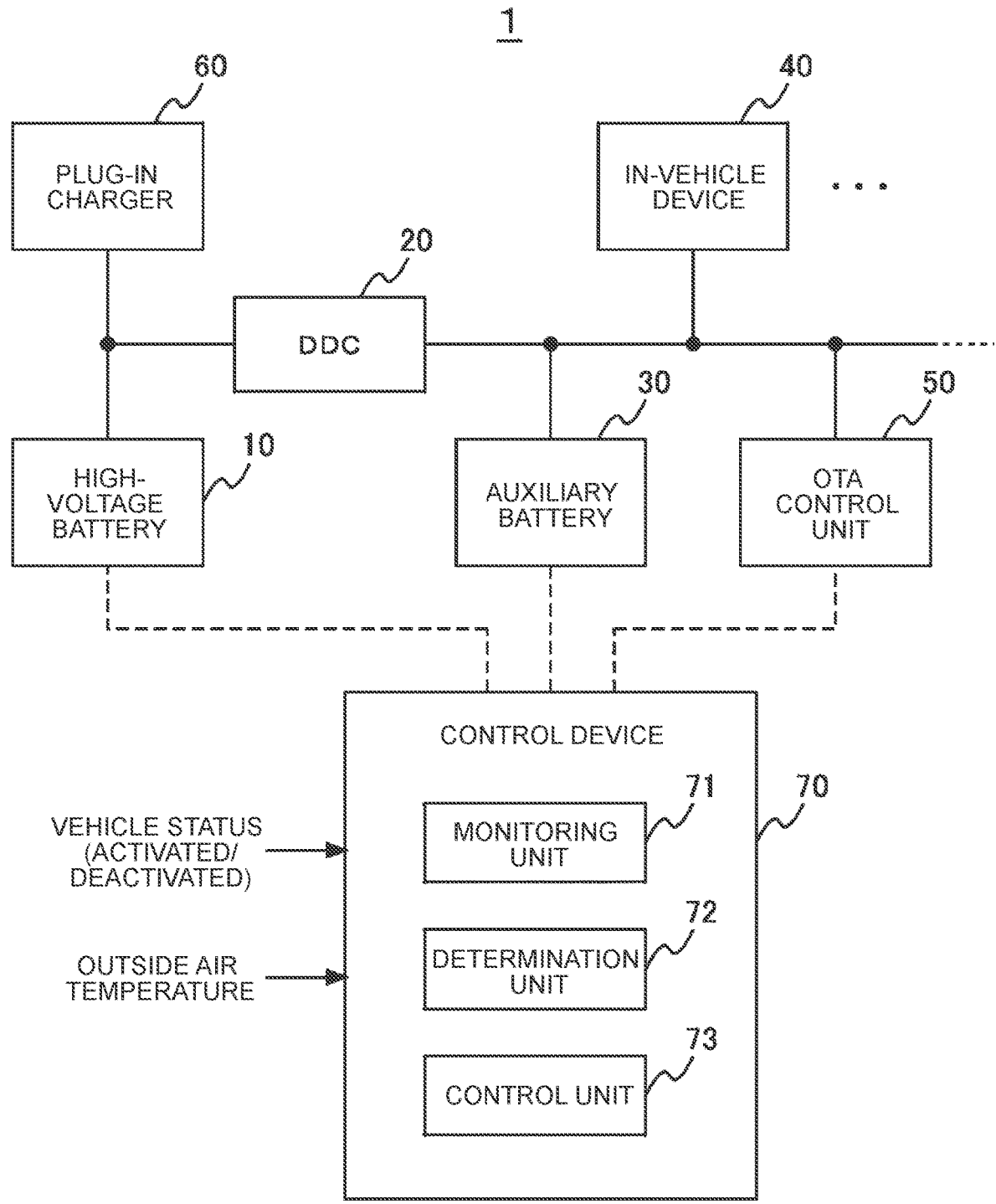
FIG. 1 is a schematic configuration diagram of a system for a vehicle including a control device according to an embodiment of the present disclosure.

FIG. 1 is a schematic configuration diagram of a vehicle system 1 including a control device 70 according to an embodiment of the present disclosure. The vehicle system 1 illustrated in FIG. 1 includes a high-voltage battery 10, a DCDC converter (DDC) 20, an auxiliary battery 30, an in-vehicle device 40, an OTA control unit 50, a plug-in charger 60, and a control device 70. Examples of the vehicle on which the vehicle system 1 is mounted include plug-in hybrid electric vehicle (PHEV) and battery electric vehicle (BEV).

The high-voltage battery 10 is a battery for supplying electric power to DCDC converter 20. In addition, the high-voltage battery 10 can store electric power of an external power source via a plug-in charger 60 that can be connected to an external power source (not shown). A secondary battery such as a lithium-ion battery configured to be chargeable and dischargeable is used for the high-voltage battery 10. A starter motor, a traveling motor, and the like are connected to the high-voltage battery 10, but the illustration is omitted.

A DCDC converter (DDC) 20 is a power converter that lowers the high-voltage power supplied from the high-voltage battery 10 to a predetermined low-voltage power and outputs the reduced-voltage power to the auxiliary battery 30, the in-vehicle device 40, and the like.

The auxiliary battery 30 is a battery for supplying electric power to the in-vehicle device 40, OTA control unit 50, and the like. A lead battery (secondary battery) configured to be chargeable and dischargeable is used for the auxiliary battery 30. The auxiliary battery 30 can store (charge) the electric power outputted from DCDC converter 20, and can supply (discharge) the electric power stored therein to the in-vehicle device 40, OTA control unit 50, and the like.

The in-vehicle device 40 is a device and/or equipment such as an Electronic Control Unit (ECU) or an actuator mounted on a vehicle, and mainly operates with electric power supplied from the auxiliary battery 30. One or more of the in-vehicle devices 40 are mounted in accordance with the specifications of the vehicle.

OTA control unit 50 is a device having a function of performing software update of an electronic control unit (target electronic control unit) to be updated. OTA control unit 50 is wirelessly connected to a server via a communication network such as the Internet through a communication device (such as a data communication module) (not shown) mounted on the vehicle. OTA control unit 50 executes control so-called Over The Air (OTA) for performing software update of the electronic control unit by downloading software (update data) from the server and installing the downloaded software in the target electronic control unit. The power for OTA control unit 50 to execute the software-updating process is supplied from the auxiliary battery 30.

The plug-in charger 60 can be connected to an external power supply (not shown) via a predetermined connection plug. When the plug-in charger 60 is connected to an external power source, the plug-in charger can supply electric power to the high-voltage battery 10 (external charge) or supply electric power to DCDC converter 20.

The control device 70 is configured to manage the status of the high-voltage battery 10, the auxiliary battery 30, and OTA control unit 50, instruct operation, and the like. In particular, the control device 70 of the present embodiment can control the updating of the software of the target electronic control unit by OTA control unit 50 based on the state of the vehicle (operation/non-operation), the temperature outside the vehicle (outside air temperature), and the state of the auxiliary battery 30. The control device 70 includes a monitoring unit 71, a determination unit 72, and a control unit 73.

The control device 70 is typically configured to include a processor such as a Central Processing Unit (CPU), a memory such as a Random Access Memory (RAM), a readable/writable storage medium such as a hard disk drive (HDD) or a solid state drive (SSD), an input/output interface, and the like, and realizes all or a part of functions performed by the monitoring unit 71, the determination unit 72, and the control unit 73 by the processor reading and executing a program stored in the memory.

The monitoring unit 71 monitors the state of the auxiliary battery 30 and acquires a desired physical quantity. Examples of the physical quantity of the auxiliary battery 30 include voltage, current, temperature, and State Of Charge (SOC). The voltage, the current, and the temperature of the auxiliary battery 30 can be acquired via a detection element such as a sensor included in the auxiliary battery 30. The storage amount of the auxiliary battery 30 can be derived by performing calculation or the like using the physical quantity acquired via the detection element.

The determination unit 72 determines whether or not the storage amount of the auxiliary battery 30 acquired by the monitoring unit 71 is equal to or greater than a predetermined storage amount (first storage amount). Further, the determination unit 72 determines whether or not the temperature of the auxiliary battery 30 acquired by the monitoring unit 71 is equal to or higher than a predetermined temperature (first temperature, second temperature). A method of setting the first storage amount, the first temperature, and the second temperature will be described later.

The control unit 73 selects and executes a control for causing OTA control unit 50 to perform a software-updating process of the electronic control unit after the vehicle has finished traveling, or a control not to perform the software-updating process based on the determination by the determination unit 72. The control performed by the control unit 73 will be described in detail below.

Control

Figure 2A:
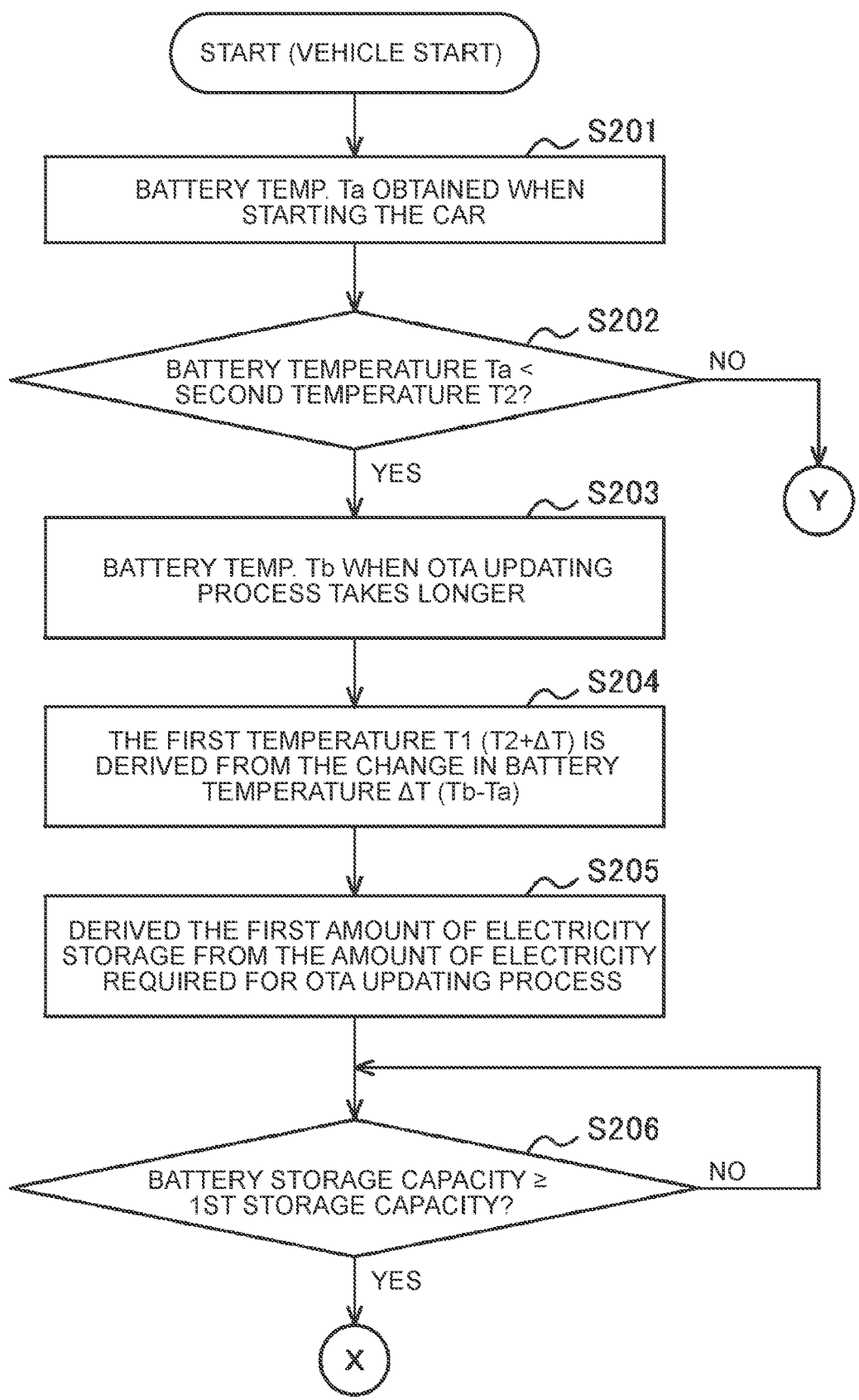
FIG. 2A is a flowchart of a process of software-updating control executed by a control device.
Figure 3:
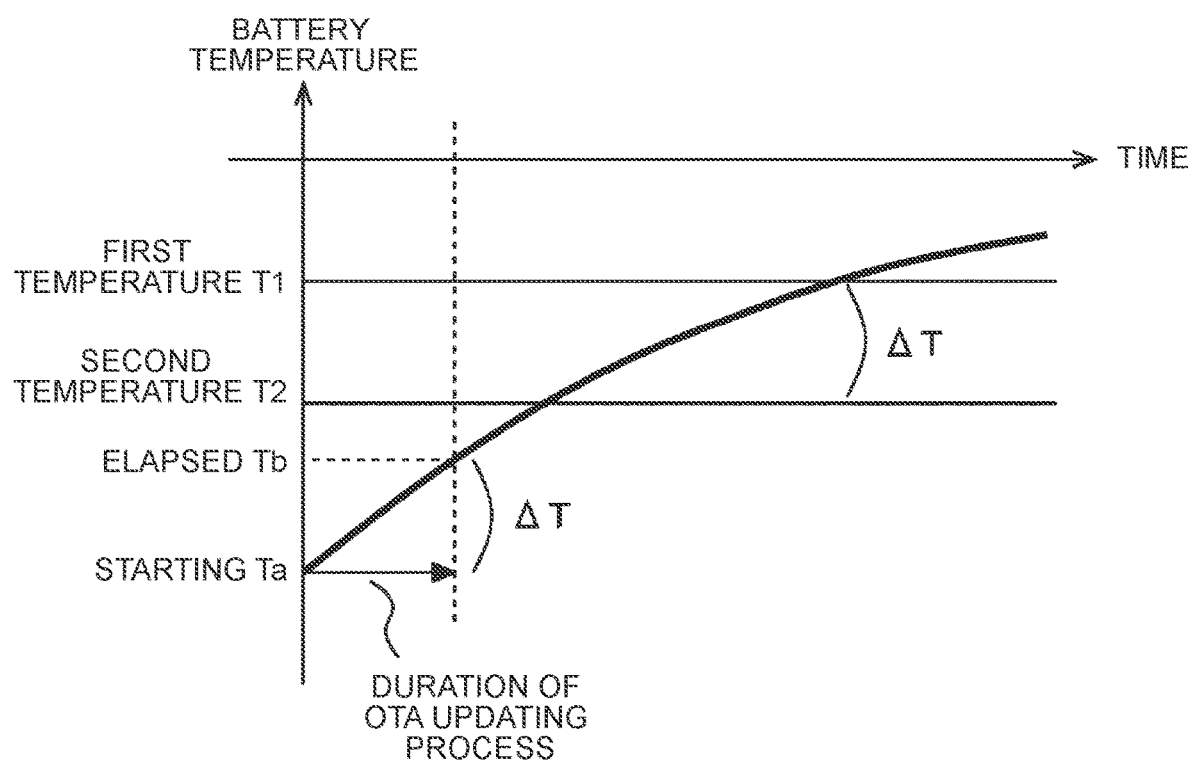
FIG. 3 is a diagram for explaining a setting example of the first temperature and the second temperature of the auxiliary battery.

Next, the control executed by the control device 70 according to the present embodiment will be described with reference to FIGS. 2A, 2B, and 3. FIGS. 2A and 2B are flow charts for explaining a process sequence of the software-update control executed by the control device 70. The process of FIG. 2A and the process of FIG. 2B are connected by connections X and Y. FIG. 3 is a diagram for explaining the relationship between the time elapsed since the start of the vehicle (horizontal axis) and the temperature (vertical axis) of the auxiliary battery 30.

The software-update control illustrated in FIGS. 2A and 2B is started when the vehicles are started (operated). Examples of the starting of the vehicle include turning on the ignition (IG-ON) and starting the engine, and turning on the power supply system (READY-ON) to enable the vehicle to travel.

S201

The monitoring unit 71 of the control device 70 acquires the temperature Ta of the auxiliary battery 30 when the vehicle is started. The temperature obtained here is the temperature when the auxiliary battery 30 is conforming to the ambient temperature. Therefore, when the vehicles are not used for a long time (for example, the time during which the ignition is turned off is equal to or longer than a predetermined time), the outside air temperature may be set as the temperature Ta of the auxiliary battery 30. When the temperature Ta of the auxiliary battery 30 at the time of starting is acquired by the monitoring unit 71, the process proceeds to S202.

S202

The determination unit 72 of the control device 70 determines whether or not the temperature Ta of the auxiliary battery 30 at the time of starting acquired by the monitoring unit 71 is less than a predetermined second temperature T2. This determination is made to determine whether the ambient temperature of the auxiliary battery 30 is so low that the software update control needs to be applied. Therefore, the second temperature T2 is set to an appropriate temperature based on the temperature dependency of the auxiliary battery 30, OTA performance required for the vehicles, and the like (for example, 5° C.). When the determination unit 72 determines that the temperature Ta of the auxiliary battery at the time of starting the vehicle is less than the second temperature T2 (S202, Yes), the process proceeds to S203. On the other hand, when the determination unit 72 determines that the temperature Ta of the auxiliary battery 30 at the time of starting the vehicle is equal to or higher than the second temperature T2 (S202, No), the process proceeds to S212.

S203

The monitoring unit 71 of the control device 70 acquires the temperature Tb of the auxiliary battery 30 when the required time of OTA updating process has elapsed since the start of the vehicle. OTA updating process is a process of updating the software of the target electronic control unit that is waiting for OTA control unit 50 to execute (waiting for processing permission). The required time of OTA updating process is a time (first time) required from the beginning to the completion of OTA updating process. The first time may include a retry time when the download or installation of the update data fails. The required period of OTA updating process may be, for example, determined in advance by a test or may be given by an OTA from a server. When the monitoring unit 71 acquires the temperature Tb of the auxiliary battery 30 when the required time of OTA updating process has elapsed, the process proceeds to S204.

S204

The determination unit 72 of the control device 70 calculates a change $\Delta T$ (=Tb−Ta), which is a difference between the temperature Ta of the auxiliary battery 30 acquired by the monitoring unit 71 and the temperature Tb of the auxiliary battery 30. Then, the determination unit 72 derives the first temperature T1 from the calculated variation $\Delta T$ of the temperature of the auxiliary battery 30. The first temperature T1 is a temperature for determining whether OTA updating process is permitted to be performed, and is derived by adding the change $\Delta T$ of the battery temperature to the second temperature T2 (T1=T2+$\Delta T$). See FIG. 3. Such a derivation method is based on the finding of the inventor that the change amount $\Delta T$ of the battery temperature increased in the time corresponding to the required time of OTA updating process corresponds to the battery temperature decreased by the natural heat dissipation in the actual OTA updating process. Therefore, the second temperature T2 to which the present software update control needs to be applied is added with the change amount $\Delta T$ of the battery temperature to provide a temperature offset, so as to prevent the power from being supplied in the middle of the update process and the update from being incomplete. When the determination unit 72 derives the first temperature T1 of the auxiliary battery 30, the process proceeds to S205.

S205

The determination unit 72 of the control device 70 derives the first power storage amount from the power amount required for OTA updating process. The amount of electric power required for OTA updating process is the amount of electric power consumed by OTA control unit 50, the target electronic control unit, and the like from the beginning to the completion of the updating process with respect to the process of updating the software of the target electronic control unit that is waiting for OTA control unit 50 to execute (waiting for the process permission). The power required for OTA updating process is given in advance from, for example, a server. The determination unit 72 derives a value obtained by adding the amount of electric power required for OTA updating process to the predetermined amount of electric power stored in the auxiliary battery 30 as the first amount of electric power stored. A predetermined value that is equal to or greater than the lower limit value of the amount of stored electricity that is not in an overdischarge state is used as the predetermined amount of stored electricity of the auxiliary battery 30. When the determination unit 72 derives the first storage capacity in the auxiliary battery 30, the process proceeds to S206.

S206

The determination unit 72 of the control device 70 determines whether or not the storage amount of the auxiliary battery 30 is equal to or greater than the first storage amount. This determination is made in order to confirm that the auxiliary battery 30 is not in an over-discharge state (battery rise) even if OTA updating process is executed. When the determination unit 72 determines that the storage amount of the auxiliary battery 30 is equal to or larger than the first storage amount (S206, Yes), the process proceeds to S207. On the other hand, when the determination unit 72 determines that the storage amount of the auxiliary battery 30 is less than the first storage amount (S206, No), it waits until the storage amount of the auxiliary battery 30 becomes equal to or greater than the first storage amount. In this case, control may be performed to forcibly charge the auxiliary battery 30 until the amount of electricity stored in the auxiliary battery 30 becomes equal to or larger than the first amount of electricity stored.

S207

The control unit 73 of the control device 70 determines whether or not the vehicle has finished traveling. End of travel of the vehicle is that the ignition is turned off (IG-OFF) and the engine is stopped, or that the power supply is stopped (READY-OFF) and the vehicle is not allowed to travel. When the control unit 73 determines that the vehicle has finished traveling (S207, Yes), the process proceeds to S208. On the other hand, when the control unit 73 has not determined that the vehicle has finished traveling (S207, No), it waits for the vehicle to finish traveling.

S208

The determination unit 72 of the control device 70 determines whether or not the temperature of the auxiliary battery 30 when the traveling of the vehicle is completed is equal to or higher than the first temperature T1. This determination is made in order to confirm whether the present temperature of the auxiliary battery 30 is at a temperature that does not affect OTA updating process even if the present temperature naturally decreases therefrom. When the determination unit 72 determines that the temperature of the auxiliary battery 30 is equal to or higher than the first temperature T1 (S208, Yes), the process proceeds to S209. On the other hand, when the determination unit 72 determines that the temperature of the auxiliary battery 30 is less than the first temperature T1 (S208, No), the process proceeds to S212.

S209

The control unit 73 of the control device 70 determines whether or not external charging using an external power source is performed via the plug-in charger 60 after the traveling of the vehicle is completed. This determination is performed because the temperature of the auxiliary battery 30 may decrease and affect OTA updating process while the high-voltage battery 10 is being charged by performing external charging after the traveling of the vehicle is completed. When the control unit 73 determines that the external charge is being performed (S209, Yes), the process proceeds to S210. On the other hand, when the control unit 73 determines that the external charge is not being performed (S209, No), the process proceeds to S211.

S210

The control unit 73 of the control device 70 performs control so as to stop the external charging via the plug-in charger 60. Thus, the power consumption of the auxiliary battery 30 caused by the external charging process can be suppressed, and the software update can be performed using the electronic control unit that performs the external charging process as a target. When the control unit 73 controls to stop the external charging via the plug-in charger 60, the process proceeds to S211.

S211

The control unit 73 of the control device 70 executes OTA updating process of the software that OTA control unit 50 is waiting to execute. When OTA updating process is performed by the control unit 73, the software updating control is ended.

S212

The control unit 73 of the control device 70 ends the software update control without executing OTA update process of the software that OTA control unit 50 is waiting to execute. In this case, the determination of the permission to execute OTA updating process is left to the next time the vehicle is started (subsequent trip).

Action, Effect, Etc.

As described above, according to the control device 70 according to the embodiment of the present disclosure, both the storage amount and the temperature of the auxiliary battery 30 that supplies the electric power for performing OTA updating process are monitored, and OTA updating process is performed when the storage amount of the auxiliary battery 30 is sufficient to cover the electric power consumed in OTA updating process when the traveling of the vehicle is completed (the first storage amount or more), and the temperature (the first temperature T1 or more) that does not affect the updating even if the temperature of the auxiliary battery 30 decreases during OTA updating process.

By setting the first temperature T1 based on the variation ΔT of the temperature of the auxiliary battery 30 at a low temperature, it is possible to secure a margin for the temperature drop of the auxiliary battery 30 after the traveling of the vehicle is completed. Therefore, even if the software update processing of the electronic control unit is started, it is possible to prevent the processing from ending in an incomplete state. Thus, even when the temperature of the auxiliary battery 30 is lower (lower than the second temperature T2), the software-updating process of the electronic control unit can be performed while ensuring the startability of the vehicle.

Although an embodiment of the present disclosure has been described above, the present disclosure can be regarded as a control device, a method executed by a control device including a processor and a memory, a program for executing the method, a computer-readable non-transitory storage medium storing a program, a system including a control device and a vehicle, and the like.

The control device of the present disclosure can be used in vehicles or the like capable of executing a software-updating process using an OTA technique.

What is claimed is:

1. A control device for controlling update of software of an electronic control unit mounted on a vehicle, the control device comprising:
a processor configured to:
monitor a power storage amount and a temperature of a battery that supplies electric power for performing an update process of the software;
determine whether the power storage amount of the battery is equal to or greater than a first power storage amount and whether the temperature of the battery is equal to or higher than a first temperature; and
in a case where the temperature of the battery at a time of a start of the vehicle is lower than a second temperature that is lower than the first temperature, after traveling of the vehicle ends, perform control for executing the update process of the software when the processor determines that the power storage amount of the battery is equal to or greater than the first power storage amount and the temperature of the battery is equal to or higher than the first temperature, wherein
the second temperature is a reference temperature value for determining whether the temperature of the battery is sufficiently low to require performing control for executing the update process of the software,
completion of the update process of the software requires a first amount of time,
a third temperature is measured after the first amount of time has passed from the start of the vehicle,
a temperature change amount is calculated by subtracting the temperature of the battery at the time of the start of the vehicle from the third temperature, and
the first temperature is a sum of the temperature change amount and the second temperature.

2. The control device according to claim 1, wherein the first power storage amount is set to be equal to or greater than a value obtained by adding an amount of electric power required for completing the update process of the software to an amount of electric power required for starting the vehicle.

3. The control device according to claim 1, wherein the time required to complete the update process of the software includes a retry time in case the update process of the software fails.

4. The control device according to claim 1, wherein the temperature of the battery at the time of the start of the vehicle is set to an outside air temperature of the vehicle.

5. The control device according to claim 1, wherein in a case where external charging for the vehicle is being executed, the processor performs control for stopping the external charging when the update process of the software is executed.

6. The control device according to claim 1, wherein the second temperature is set based on a temperature dependency of the battery.

7. The control device according to claim 1, wherein the second temperature is 5° C.

8. The control device according to claim 1, wherein the processor is further configured to:
determine whether an ignition of the vehicle has been turned off for a predetermined time period or longer; and
set the temperature of the battery at the time of the start of the vehicle to an outside air temperature when the ignition has been turned off for the predetermined time period or longer.

* * * * *